United States Patent
Eftekhari et al.

(10) Patent No.: US 11,563,250 B2
(45) Date of Patent: Jan. 24, 2023

(54) BATTERY PACK ASSEMBLY HAVING FOAM ENCLOSURE AND METHOD OF SUPPORTING A FOAM BATTERY PACK ENCLOSURE

(71) Applicant: Ford Global Technologies, LLC, Dearborn, MI (US)

(72) Inventors: Mohammadreza Eftekhari, Novi, MI (US); Patrick Daniel Maguire, Ann Arbor, MI (US); Kanchana Perumalla, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 16/903,984

(22) Filed: Jun. 17, 2020

(65) Prior Publication Data
US 2021/0399268 A1 Dec. 23, 2021

(51) Int. Cl.
*H01M 50/20* (2021.01)
(52) U.S. Cl.
CPC ........ *H01M 50/20* (2021.01); *H01M 2220/20* (2013.01)
(58) Field of Classification Search
CPC ............ H01M 50/20; H01M 2220/20; H01M 50/218; H01M 50/262; H01M 50/209; H01M 50/244; H01M 50/227; H01M 50/249
See application file for complete search history.

(56) References Cited

U.S. PATENT DOCUMENTS

| | | | |
|---|---|---|---|
| 5,626,982 A * | 5/1997 | Kawai | B32B 5/18 428/318.6 |
| 6,109,380 A * | 8/2000 | Veenstra | H01M 50/20 180/68.5 |
| 9,853,263 B2 | 12/2017 | Baek et al. | |
| 2013/0252059 A1* | 9/2013 | Choi | H01M 50/227 156/60 |
| 2016/0204400 A1* | 7/2016 | Baek | H01M 50/20 429/159 |
| 2016/0218335 A1* | 7/2016 | Baek | B60L 50/16 |
| 2017/0232877 A1* | 8/2017 | De Nichilo | B60N 2/68 297/452.18 |
| 2019/0221793 A1 | 7/2019 | Krueger et al. | |
| 2019/0221802 A1 | 7/2019 | Maguire et al. | |
| 2019/0334136 A1 | 10/2019 | Eftekhari et al. | |
| 2022/0013840 A1* | 1/2022 | Vinay Chandrakant | H01M 10/625 |

FOREIGN PATENT DOCUMENTS

| | | | |
|---|---|---|---|
| CN | 109353032 | 2/2019 | |
| JP | H08186390 | 7/1996 | |
| JP | 2010-037893 | * 2/2010 | ............... E04B 1/80 |
| KR | 20150121322 | 10/2016 | |

OTHER PUBLICATIONS

JP 2010-037893 machine English translation (Year: 2010).*

* cited by examiner

*Primary Examiner* — Michael L Dignan
(74) *Attorney, Agent, or Firm* — David B. Kelley; Carlson, Gaskey & Olds, P.C.

(57) ABSTRACT

A traction battery pack assembly includes, among other things, a foam section of a battery pack enclosure. The foam section provides a recessed area that at least partially receives a traction battery array. A substructure assembly is partially disposed within the foam section. An attachment point is provided by the substructure assembly. The attachment point is outside the foam section.

20 Claims, 4 Drawing Sheets

BATTERY PACK ASSEMBLY HAVING FOAM ENCLOSURE AND METHOD OF SUPPORTING A FOAM BATTERY PACK ENCLOSURE

TECHNICAL FIELD

This disclosure relates generally to a battery pack enclosure and, in particular, an enclosure having a substructure assembly within a foam.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. A traction battery pack of an electrified vehicle can include a plurality of battery cell assemblies arranged in one or more battery arrays with an enclosure.

SUMMARY

A traction battery pack assembly according to an exemplary aspect of the present disclosure includes, among other things, a foam section of a battery pack enclosure. The foam section provides a recessed area that at least partially receives a traction battery array. A substructure assembly is partially disposed within the foam section. An attachment point is provided by the substructure assembly. The attachment point is outside the foam section.

Another example of the foregoing traction battery pack assembly includes a frame of the substructure assembly. The frame provides a circumferentially continuous hoop.

Another example of any of the foregoing traction battery pack assemblies includes a connection bracket of the substructure assembly. The connection bracket has an exposed portion providing the attachment point and an underlying portion within the foam section.

Another example of any of the foregoing traction battery pack assemblies includes a wire frame of the substructure assembly. The wire frame is disposed entirely within the foam section.

In another example of any of the foregoing traction battery pack assemblies, the connection bracket is directly connected to the wire frame within the foam section.

In another example of any of the foregoing traction battery pack assemblies, the attachment point is configured to attach the battery pack enclosure to a vehicle frame, and the substructure assembly is configured to provide a path for grounding the traction battery array to the vehicle frame.

In another example of any of the foregoing traction battery pack assemblies, the foam section includes an enclosure floor and enclosure walls extending transversely from the enclosure floor to provide the recessed area.

Another example of any of the foregoing traction battery pack assemblies includes a frame of the substructure disposed within the enclosure walls.

In another example of any of the foregoing traction battery pack assemblies, the frame extends circumferentially continuously about an entire periphery of the recessed area.

In another example of any of the foregoing traction battery pack assemblies, an axial section of the frame is circular.

In another example of any of the foregoing traction battery pack assemblies, the foam section comprises an expanded polypropylene foam.

In another example of any of the foregoing traction battery pack assemblies, the substructure assembly is a metal or metal alloy.

In another example of any of the foregoing traction battery pack assemblies, the foam section is a foam tray of the battery pack enclosure and the substructure assembly is a tray substructure assembly. The assembly further includes a foam cover of the battery pack enclosure and a cover substructure assembly that is at least partially disposed within the foam cover. The attachment point of the tray substructure assembly is configured to attach directly to an attachment point provided by the cover substructure assembly.

In another example of any of the foregoing traction battery pack assemblies, the foam section is overmolded about the substructure assembly.

In another example of any of the foregoing traction battery pack assemblies, the foam section has an uncovered exterior side that is exposed to an exterior of the battery pack and an uncovered interior side that is exposed to an interior of the battery pack.

Another example of any of the foregoing traction battery pack assemblies further includes a first bracket of the substructure assembly, a second bracket of the substructure assembly, and a wire hoop of the substructure assembly. The first and second bracket are connected to the wire hoop within the foam section, The first bracket includes a first attachment point that is outside the foam section and is configured to attach the battery pack enclosure to a structural portion of a vehicle. The second bracket includes a second attachment point that is outside the foam section and is configured to attach the foam section of the battery pack enclosure to another substructure assembly within another foam section of the battery pack enclosure.

A method of supporting a battery pack enclosure according to another exemplary aspect of the present disclosure includes providing a substructure assembly having an attachment point, and overmolding a foam section of a battery pack enclosure about an underlying portion of the substructure assembly. The foam section has a recessed area that is configured to receive a traction battery array. The attachment point is outside the foam section in an exposed portion of the substructure assembly.

In another example of the foregoing method of supporting a battery pack enclosure, the attachment point is configured to attach the battery pack enclosure to a vehicle frame.

In another example of any of the foregoing methods of supporting a battery pack enclosure, the attachment point is configured to attach traction battery array to the battery pack enclosure.

In another example of any of the foregoing methods of supporting a battery pack enclosure, the substructure assembly includes a frame extending circumferentially continuously about an entire periphery of the recessed area after the overmolding.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details embodiments and methods associated with supporting an enclosure of a traction battery pack. In particular, the disclosure details a substructure assembly that is disposed within a primarily foam battery pack enclosure. The foam can be an expanded foam polymer that is overmolded about the substructure assembly. The substructure assembly can be utilized to secure the battery pack to a vehicle, to secure together various portions of the battery pack, or some combination of these.

Figure 1:
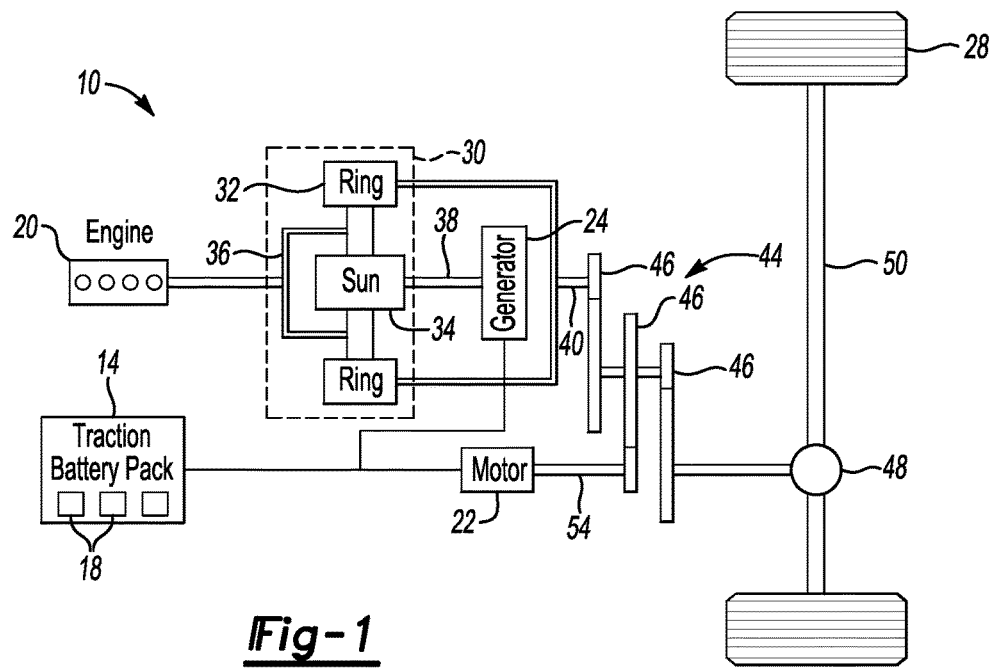
FIG. 1 illustrates a schematic view of an example powertrain of an electrified vehicle.

Referring to FIG. 1, a powertrain 10 of a plug-in hybrid electric vehicle (PHEV) includes a traction battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

Although depicted as a PHEV, it should be understood that the concepts described herein are not limited to PHEVs and could extend to traction battery packs in any other type of electrified vehicle, including, but not limited to, other hybrid electric vehicles (HEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery pack 14.

Figure 2:
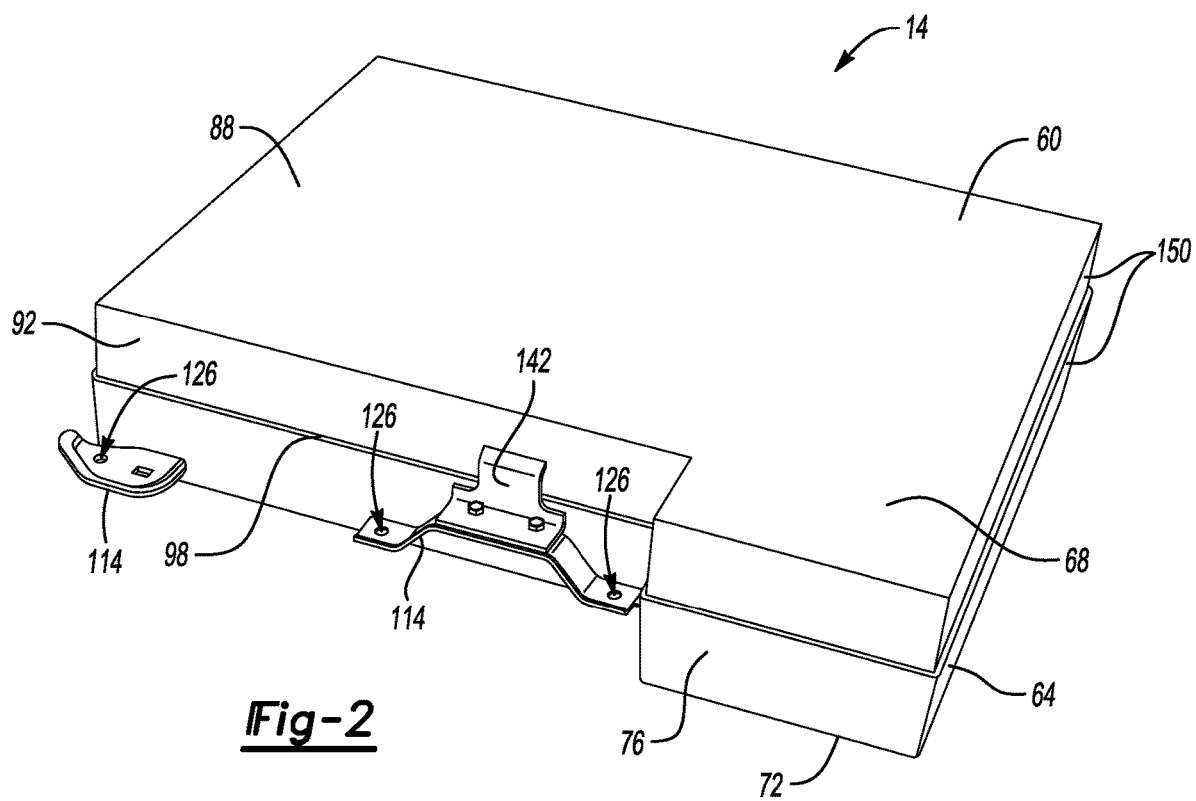
FIG. 2 illustrates a perspective view of a traction battery pack from the powertrain of FIG. 1.
Figure 3:
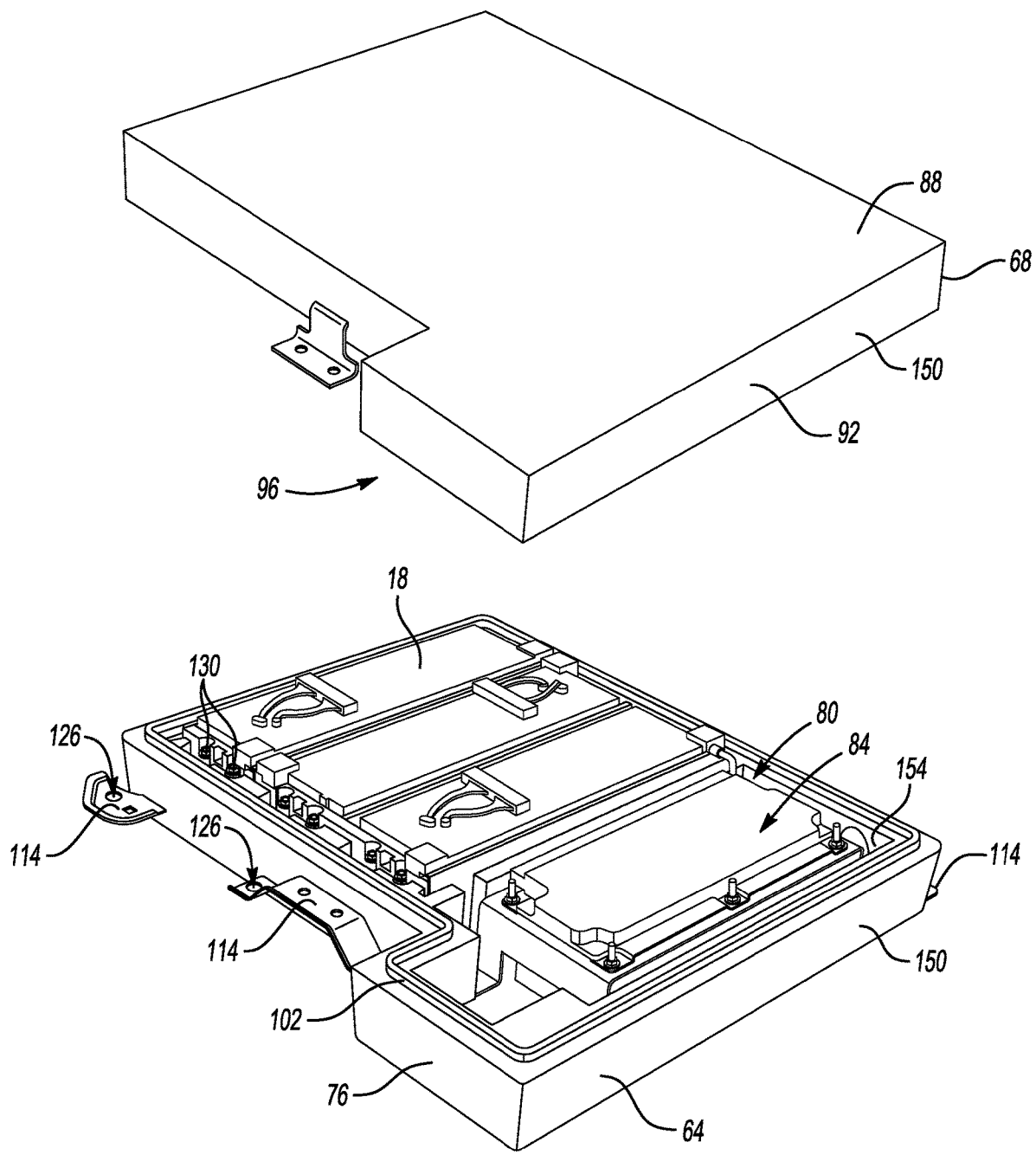
FIG. 3 illustrates a perspective view of the battery pack of FIG. 2 with a cover of a foam battery pack enclosure removed.

With reference to FIGS. 2 and 3, the example traction battery pack 14 includes a battery pack enclosure 60. In the exemplary embodiment, the battery pack enclosure 60 includes a tray 64 and a cover 68.

The tray 64 includes a floor 72 and a plurality of walls 76 extending transversely from the floor 72 to provide a recessed area 80 within the tray 64. The recessed area 80 opens vertically upward. Vertical, for purposes of this disclosure, is with reference to ground and the ordinary orientation of the battery pack 14 when in an installed position within the vehicle.

The battery arrays 18 and other battery components 84 of the battery pack 14 are at least partially held within the recessed area 80 provided by the tray 64. The other battery components 84 may include, but are not limited to, a bussed electrical center (BEC), a battery electric control module (BECM), and an electrical distribution system (EDS), which may include one or more wiring harnesses, a plurality of input/output (I/O) connectors, etc.

The cover 68 includes a top side 88 and a plurality of walls 92 extending transversely from the top side 88 downward to define another recessed area 96. When the battery pack 14 is assembly, the battery arrays 18 and other battery components 84 are at least partially held within the recessed area 96 provided by the cover 68. Although both the tray 64 and the cover 68 include a recessed area in this exemplary embodiment, other examples could include an enclosure having a recessed area within the tray, but no recessed area within the cover. Still other examples could include an enclosure having a recessed area within the cover, but no recessed area within the tray.

The cover 68 meets the tray 64 along an interface 98 when the battery pack 14 is assembled. The walls 76 can include a tongue portion 102 that fits within a groove of the walls 92 of the cover to help secure the cover 68 to the tray 64 along the interface 98.

When the traction battery pack 14 is installed within a vehicle, the top side 88 of the enclosure 60 can be disposed along an underside of the vehicle, such as along an underbody structure of the vehicle. The battery pack 14 can be disposed in this position outside the vehicle. In another example, the battery pack 14 could be positioned within the vehicle. The battery pack 14 can be attached to a structural portion of the vehicle, here the underbody, by attaching the battery pack enclosure 60 to the structural portion of the vehicle.

For purposes of this disclosure, references to top and bottom are also with reference to the general orientation of the battery pack 14 when installed within the vehicle, and with reference to the orientation of the vehicle during ordinary operation.

The tray 64 and the cover 68 are primarily foam in this example. The foam can be an expanded polypropylene (EPP) foam or another type of expanded foam polymer. For purposes of this disclosure, the foam of the tray 64 is considered a foam section of the tray 64, and the foam of the cover 68 is considered a foam section of the cover 68.

Figure 4:
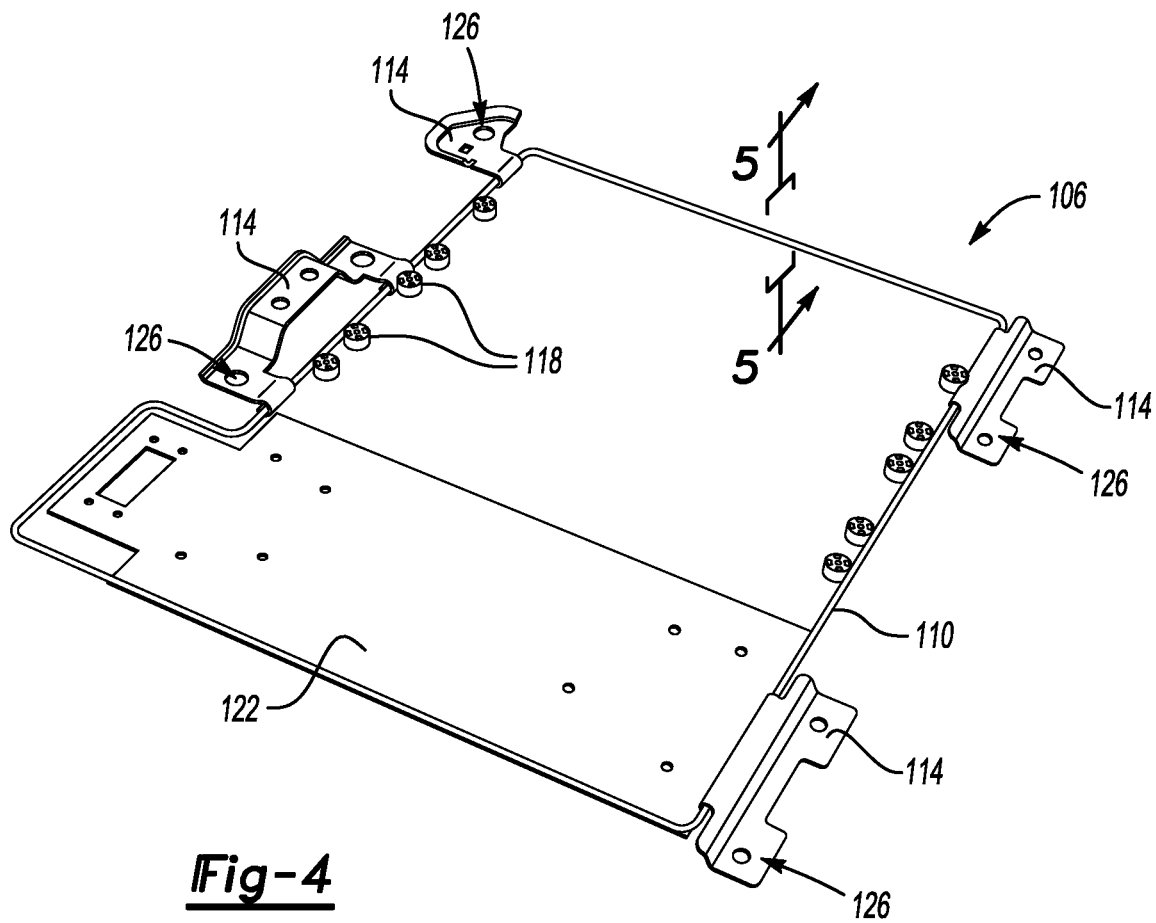
FIG. 4 illustrates a perspective view of a substructure assembly associated with the tray of the foam battery pack enclosure.
Figure 5:
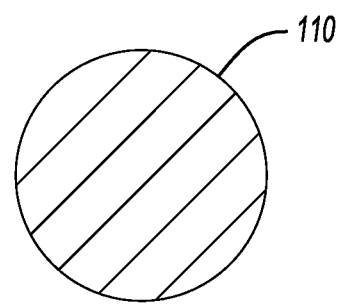
FIG. 5 illustrates a section view through a frame of the substructure of FIG. 4 at line 5-5 in FIG. 4.

With reference now to FIGS. 4 and 5, and with continued reference to FIGS. 2 and 3, a tray substructure assembly 106 is at least partially disposed within the foam section of the tray 64. The foam sections of the tray 64 can be overmolded about selected portions of the tray substructure assembly 106. The tray substructure assembly 106 can strengthen the tray 64. The tray substructure assembly 106 can help to retain the tray 64 and to retain structures within the tray 64.

The tray substructure assembly 106, in the exemplary embodiment, includes a frame 110, a plurality of exterior connection brackets 114, a plurality of interior connection brackets 118, and a support brace 122. In an example, the exterior connection brackets 114, the interior connection brackets 118, and the support brace 122 are secured directly to the frame 110. Welds could be used to secure these components, for example. Once secured, the frame 110, the exterior connection brackets 114, the interior connection brackets 118, and the support brace 122 provide the tray substructure assembly 106 shown in FIG. 4. In other embodiments of the tray substructure assembly 106, the frame 110, the exterior connection brackets 114, the interior connection brackets 118, and the support brace 122, may be formed by one or more structural stampings. The exterior connection brackets 114, the interior connection brackets 118, and the support brace 122 could be formed as a single, monolithic structural stamping, or as individual stampings that are then joined together via welds, for example.

To provide the tray 64, the tray substructure assembly 106 of FIG. 4 can be placed within a mold cavity. A foam base material, here expanded polypropylene pellets or granules, is then introduced into the mold cavity. Pressure and steam fuse the pellets within the mold cavity around portions of the tray substructure assembly 106 and into a shape of the tray 64.

The tray 64 can then be removed from the cavity with the foam section of the tray 64 molded about selected portions of the tray substructure assembly 106. The portions within the foam section are considered underlying portions of the tray substructure assembly 106. The portions outside the foam section are considered exposed portions of the tray substructure assembly 106.

After the overmolding, portions of the exterior connection brackets 114 project outside the foam sections of the tray 64. The projecting portions of the exterior connection brackets 114 can provide attachment points that can be utilized to, for example, secure the battery pack 14 within the vehicle. Here, some of the attachment points 126 are apertures within the exterior connection brackets 114. A bolt or other type of mechanical fastener can extend through the apertures provided by the attachment points 126 to threadably engage the vehicle or a bracket of the vehicle thereby securing the battery pack 14.

After the overmolding, selected portions of the interior connection brackets 118 are also exposed projected into the recessed area 80 outside the foam section of the tray 64. The exposed portions of the interior connection brackets 118 provide connection points to secure components within the recessed area 80 of the tray 64. For example, bolts 130 or another type of mechanical fastener can threadably engage the interior connection brackets 118 to secure battery arrays 18 within the recessed area 80 (FIG. 3).

The support brace 122 can also include portions that are disposed outside the foam section after the overmolding. Battery components 84 can be secured to the support brace 122 within the recessed area 80. In some examples, the support brace 122 is used as a portion of a ground path for grounding the battery components 84 to the vehicle. In some examples, the support brace 122 is used as part of a thermal exchange device for heating or cooling the battery components 84.

In the exemplary embodiment, the frame 110 is positioned within the walls 76 after the overmolding and is encapsulated entirely by the foam section of the tray 64. The exemplary frame 110 is a circumferentially continuous loop that extends an entire perimeter of the recessed area 80. In another example, the wire frame 110 extends about only a portion of the perimeter.

The frame 110 is a wire frame in this example and has an axial section that is circular (see FIG. 5). The circular section can facilitate forming wire into the frame 110 having the circumferentially continuous hoop shape. The circular shape can be easier to bend than a rectangular cross-sectional shape.

The frame 110, the exterior connection brackets 114, the interior connection brackets 118, and the support brace 122 can be metal or metal alloy material. The tray substructure assembly 106, being a metal or metal alloy, can improve the structural integrity of the tray 64 and address potential issues with respect to tensile strength of the foam portions of the tray 64.

The frame 110 can help to enhance energy absorption capability of the tray 64 and surrounding areas of the battery pack 14, particularly if the frame 110 is circumferentially continuous about the recessed area 80.

As the tray substructure assembly 106 is a metal or metal alloy in the exemplary embodiment, the tray substructure assembly 106 can provide a path for grounding the battery arrays 18 and the other battery components 84 to the vehicle frame. The ground path provided by the tray substructure assembly 106 can extend from an interior of the enclosure 60 to an exterior of the enclosure 60. The ground path may extend to a chassis of the vehicle. The grounding can help to attenuate electromagnetic interference associated with electromagnetic fields of the battery pack 14, common impedance, or other forms of interference coupling. The tray substructure assembly 106 can be used as the grounding mechanism to electrically ground the conductive, but not normally energized with high voltage, battery internal components to each other and reference them to chassis ground to support electrical shock prevention practices. Furthermore, the grounding paths may support attenuation of electromagnetic interference (EMI) effects of high-voltage battery pack resulting from electromagnetic fields, common impedance, or other forms of interference coupling The tray substructure assembly 106 may be conductively coupled to other conductive sheets, screens, or filters included in the tray in support of such EMI attenuation.

Figure 6:
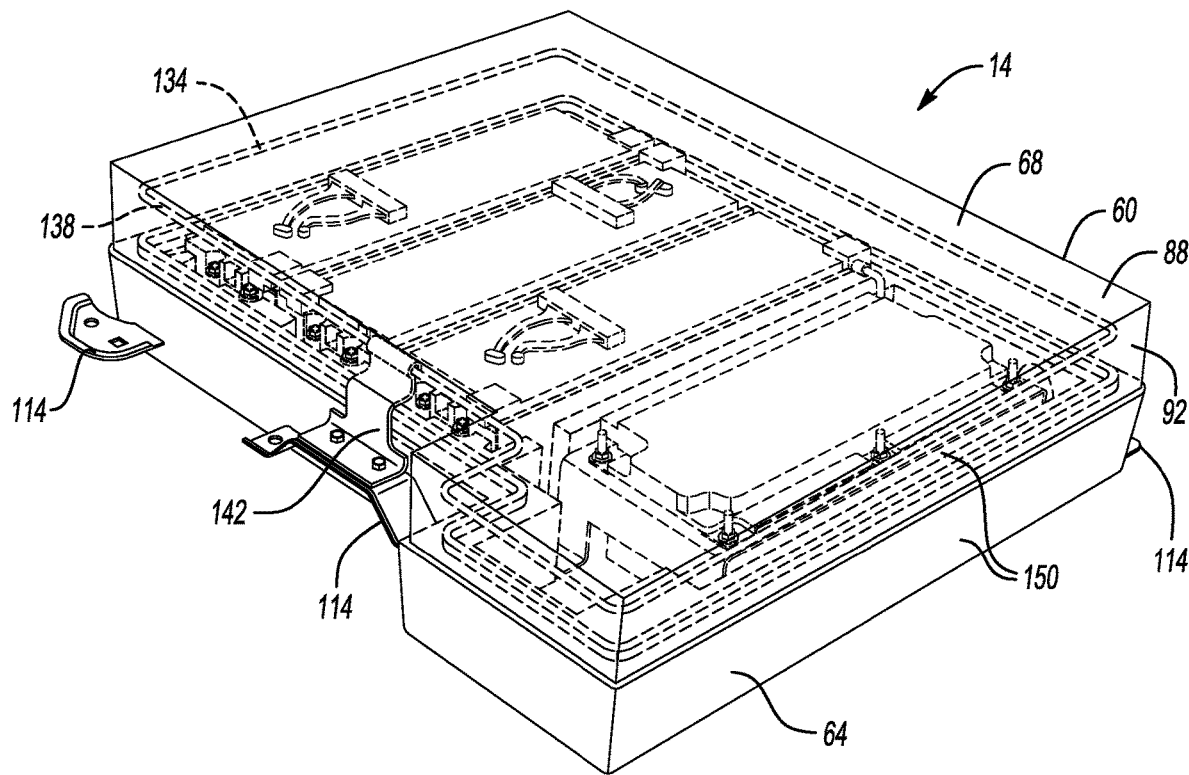
FIG. 6 illustrates the perspective view of the foam battery pack of the FIG. 2 with a substructure assembly of the cover shown in broken lines.

With reference to FIG. 6, the cover 68 of the enclosure 60 includes foam portions overmolded about a cover substructure assembly 134. The cover substructure assembly 134 includes a frame 138 extending circumferentially continuously about an entire perimeter of the recessed area provided by the cover 68. The frame 138 can be a wire frame. The cover substructure assembly 134 further includes an exterior connection bracket 142.

A portion of the exterior connection bracket 142 of the cover substructure assembly 134 extends outside the foamed portions of the cover 68. The exterior connection bracket 142 of the cover substructure assembly 134 can connect to an exterior connection bracket 114 of the tray substructure assembly 106. The connection can utilize mechanical fasteners or welds. Connecting the cover substructure assembly 134 to the tray substructure assembly 106 can help to secure the cover 68 relative to the tray 64 in an installed position.

The cover substructure assembly 134 can help the cover 68 resist tensile loads due to an impact load, for example. Like the tray substructure assembly 106, the cover substructure assembly 134 can provide a path for grounding the battery arrays 18 and the other battery components 84 to the vehicle frame. The cover substructure assembly 134 may also support grounding paths for additional attenuation of electromagnetic interferences, and may be conductively coupled to other conductive sheets, screens, or filters included in the cover in support of such EMI attenuation.

The foam sections of the tray 64 and the foam sections of the cover 68 include uncovered exterior sides 150 that are exposed to exterior areas around the battery pack 14. That is, the foam portions of the battery pack 14 are not covered, in the exemplary embodiment, by a non-foam materials. The foam portions of the tray 64 and the cover 68 further include uncovered interior sides 154 that are exposed to the interior of the battery pack 14, which is defined by the recessed areas of the tray 64 and the cover 68.

The exterior connection brackets 142 and the frame 138 could be formed as a single, monolithic structural stamping, or as individual stampings that are then joined together via welds, for example.

Figure 7:
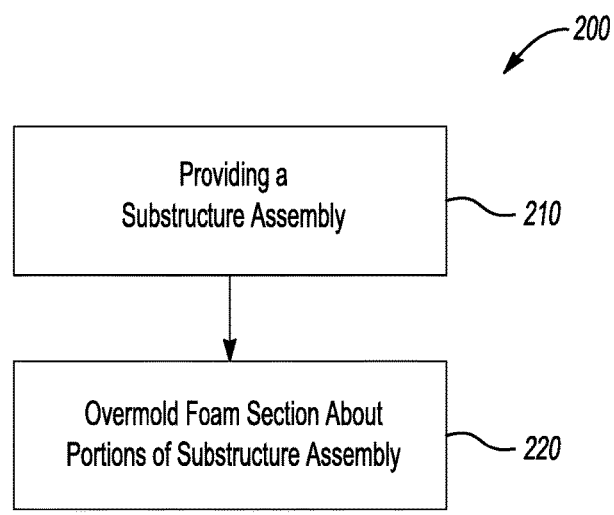
FIG. 7 illustrates a flow of an exemplary method of supporting a battery pack enclosure.

With reference now to FIG. 7, a method 200 of supporting a battery pack enclosure begins at a step 210. At the step 210, the method 200 provides a substructure assembly. The substructure assembly can include an attachment point.

Next, at a step 220, the method 200 overmolds a foam section about selected portions of the substructure assembly. The portions the substructure assembly covered by the foam section are considered underlying portions. Portions of the substructure assembly extending outside the foam section are considered exposed portions of the substructure assembly. After the step 220, the foam section and substructure assembly can be utilized as part of a battery pack enclosure.

Some features of the disclosed examples include an incorporation of a substructure assembly within a foam battery pack enclosure to facilitate securing and strengthening the foam battery pack enclosure. The substructure assembly can be utilized to secure the battery pack as well as components within the battery pack. The substructure assembly can, in particular, improve structural integrity of the enclosure and help to compensate for the tensile strength provided by the foam portion of the enclosure.

The securing utilizing the substructure assembly can be accomplished utilizing a relatively few number of mechanical fasteners. The incorporation of the substructure assembly into the battery pack via the overmolding process can reduce a cycle time associated with manufacturing the battery pack enclosure. Part complexity can also be reduced due to the substructure assembly incorporating various attachment features as a single integrated substructure assembly.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery pack assembly comprising:
   a foam section of a battery pack enclosure, the foam section providing a recessed area that at least partially receives a traction battery array;
   a substructure assembly partially disposed and embedded within the foam section; and
   an attachment point provided by the substructure assembly, the attachment point outside the foam section; and
   a connection bracket of the substructure assembly, the connection bracket having an exposed portion providing the attachment point and an underlying portion within the foam section.

2. The traction battery pack assembly of claim 1, further comprising a frame of the substructure assembly, the frame providing a circumferentially continuous hoop that is completely embedded within the foam section.

3. The traction battery pack assembly of claim 1, further comprising a wire frame of the substructure assembly, the wire frame disposed entirely within the foam section.

4. The traction battery pack assembly of claim 3, wherein the connection bracket is directly connected to the wire frame within the foam section.

5. The traction battery pack assembly of claim 1, wherein the attachment point is configured to attach the battery pack enclosure to a vehicle frame, wherein the substructure assembly is configured to provide a path for grounding the traction battery array to the vehicle frame.

6. The traction battery pack assembly of claim 1, wherein the foam section includes an enclosure floor and a plurality of enclosure walls extending transversely from the enclosure floor to provide the recessed area.

7. The traction battery pack assembly of claim 6, further comprising a frame of the substructure, the frame embedded within the plurality of enclosure walls such that the frame is completely surrounded by the foam section.

8. The traction battery pack assembly of claim 7, wherein the frame extends circumferentially continuously about an entire periphery of the recessed area.

9. The traction battery pack assembly of claim 7, wherein an axial section of the frame is circular.

10. The traction battery pack assembly of claim 1, wherein the foam section comprises an expanded polypropylene foam.

11. The traction battery pack assembly of claim 10, wherein the substructure assembly is a metal or metal alloy.

12. The traction battery pack assembly of claim 1, wherein the foam section is a foam tray of the battery pack enclosure and the substructure assembly is a tray substructure assembly, and further comprising a foam cover of the battery pack enclosure and a cover substructure assembly at least partially disposed within the foam cover, the attachment point of the tray substructure assembly configured to attach directly to an attachment point provided by the cover substructure assembly.

13. The traction battery pack assembly of claim 1, wherein the foam section is overmolded about the substructure assembly.

14. The traction battery pack assembly of claim 1, wherein the foam section has an uncovered exterior side that is exposed to an exterior of the battery pack and an uncovered interior side that is exposed to an interior of the battery pack.

15. The traction battery pack assembly of claim 1, further comprising a first bracket of the substructure assembly, a second bracket of the substructure assembly, and a wire hoop of the substructure assembly, the first and second bracket connected to the wire hoop within the foam section, the first bracket including first attachment point that is outside the foam section and is configured to attach the battery pack enclosure to a structural portion of a vehicle, the second bracket including a second attachment point that is outside the foam section and is configured to attach the foam section of the battery pack enclosure to another substructure assembly within another foam section of the battery pack enclosure.

16. A method of supporting a battery pack enclosure comprising:
providing a substructure assembly having an attachment point; and
overmolding a foam section of a battery pack enclosure about an underlying portion of the substructure assembly, the foam section having a recessed area configured to receive a traction battery array, the attachment point outside the foam section in an exposed portion of the substructure assembly, wherein a connection bracket of the substructure assembly provides at least some of the exposed portion, the connection bracket extending into the foam section to the underlying portion that is within the foam section.

17. The method of claim 16, wherein the attachment point is configured to attach the battery pack enclosure to a vehicle frame.

18. The method of claim 16, wherein the attachment point is configured to attach the traction battery array to the battery pack enclosure.

19. The method of claim 16, wherein the underlying portion of the substructure assembly includes a frame extending circumferentially continuously about an entire periphery of the recessed area after the overmolding.

20. The traction battery pack assembly of claim 1, wherein the attachment point is one of a plurality of attachment points, the plurality of attachment points including at least one interior connection bracket that is engaged to secure a traction battery array within the recessed area, wherein the plurality of attachment points includes at least one exterior connection bracket that is used to secure the battery pack enclosure to a vehicle.

* * * * *